Dec. 18, 1956 H. T. JENSEN 2,774,553
DAMPER BY-PASS FOR LAG-LEAD CONTROL
OF HELICOPTER ROTOR BLADES
Filed April 4, 1955 3 Sheets-Sheet 1

INVENTOR
H. T. JENSEN
BY M. B. Tasker
ATTORNEY

Dec. 18, 1956

H. T. JENSEN 2,774,553

DAMPER BY-PASS FOR LAG-LEAD CONTROL
OF HELICOPTER ROTOR BLADES

Filed April 4, 1955

INVENTOR
H. T. JENSEN

BY M. B. Tasker

ATTORNEY

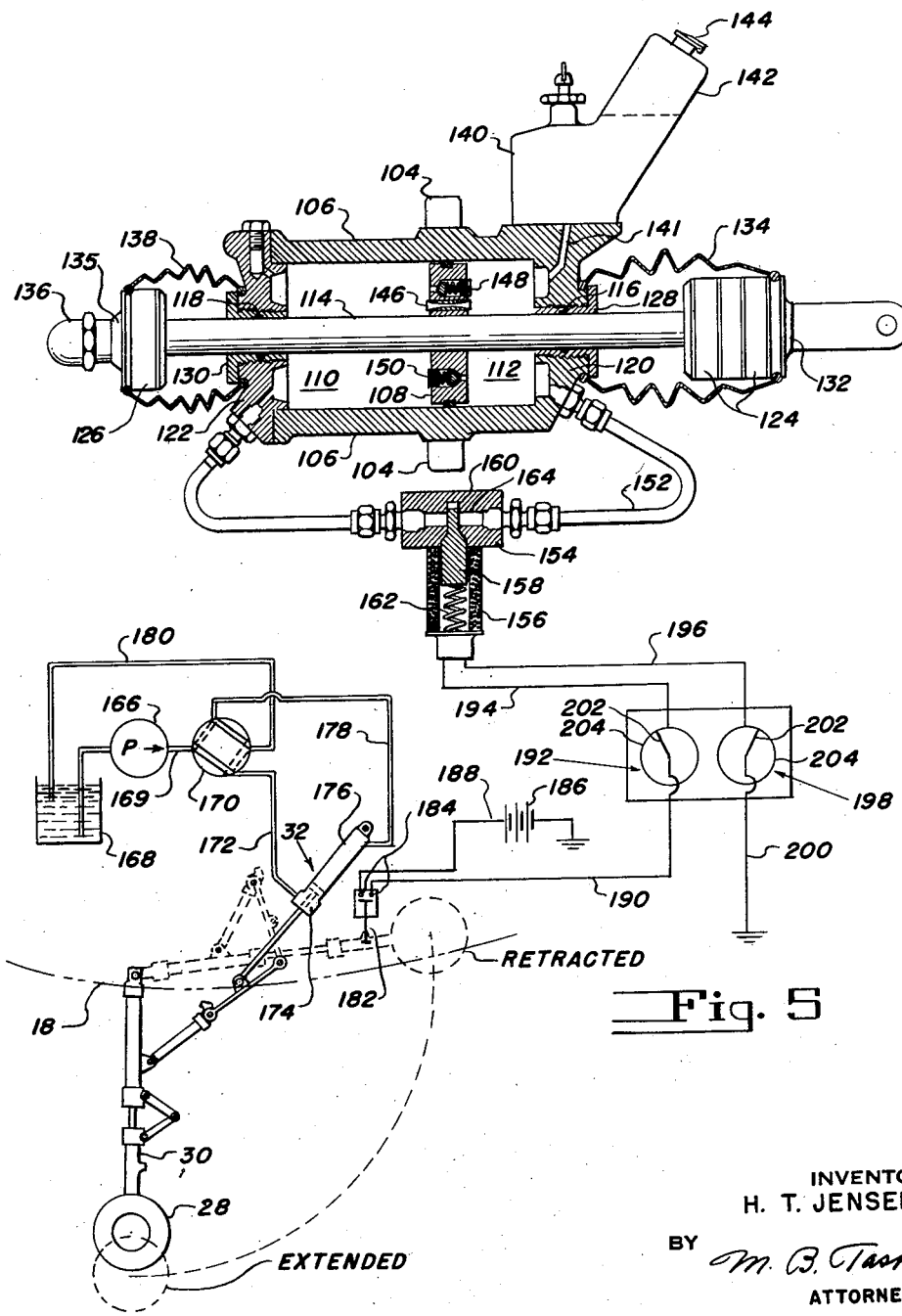

United States Patent Office 2,774,553
Patented Dec. 18, 1956

2,774,553

DAMPER BY-PASS FOR LAG-LEAD CONTROL OF HELICOPTER ROTOR BLADES

Harry T. Jensen, Milford, Conn., assignor to United Aircraft Corporation, East Hartford, Conn., a corporation of Delaware Application April 4, 1955, Serial No. 498,819

11 Claims. (Cl. 244—17.17)

This invention relates to rotary wing aircraft of the type in which the rotor blades for the main sustaining rotor are pivotally mounted on a rotor hub for movement in the plane of blade rotation about generally vertical drag hinges, and more particularly to improvements in the use of hydraulic dampers to control the lag-lead movements of the rotor blades about their drag hinges. A damper of this general type is shown in the Buivid Patent 2,554,774 issued May 29, 1951 and assigned to the assignee of this application.

Damping of the blade movements about their drag hinges is necessary to prevent ground resonance, the generation of vibrations in the blades in harmony with, and hence forced by, vibrations of the aircraft which is supported on the ground by resilient gear. The vibrations originate as a small blade oscillation and rapidly build up to a large and dangerous one which can result in breakage of the blade or the overturning of the aircraft in an incredibly short time.

The damping requirements for preventing ground resonance are, however, not favorable for forward flight which represents the greater part of the time that the aircraft is in use. In forward flight, increased flapping of the blades takes place which, due to Coriolis forces, causes increased movements of the blades about their drag hinges. Also, in forward flight there is a big difference in the drag forces acting on the advancing and retreating blades which results in further movement of the blades about their drag hinges. Thus, large blade movements about the drag hinges take place during normal forward flight and if the high damping effect which is required to prevent ground resonance is maintained in forward flight, the chordwise bending stresses in the blade spars will be extremely high and the blade life very short.

In the above-mentioned Buivid patent the blade damper is adjusted to provide the required damping to prevent ground resonance when the ship is on or near the ground and the chordwise vibratory stresses in the blades are relatively low. In forward flight, when these stresses are high, the stresses are in part relieved by pressure relief valves which are set to open just above the fluid pressure in the dampers which would occur under conditions favorable to ground resonance. It will thus be evident that in the Buivid damper the stresses in the blades in flight can never be less than that determined by the necessary setting of the relief valves to protect the blades against ground resonance during takeoff and landing. Thus, while the Buivid damper relieved the stresses in the blades somewhat in flight, it is not possible in this damper to decrease the bending stresses in the blade spars anywhere near as much as is desirable.

It is an object of the present invention to provide improved means for controlling the damper forces so as to provide the optimum damper force both under flight conditions and under conditions favorable to ground resonance.

Another object of this invention is to provide improved means for relieving the high damper forces when the aircraft is in normal flight which will automatically restore the high damper forces as the aircraft approaches the ground for landing.

A further object of the invention is to prolong the life of blades and dampers by reducing damping after the aircraft has become airborne.

A still further object of the invention is to provide a damper relief valve which is controlled by the extension and retraction of the landing gear of the aircraft.

A further object of the invention is generally to improve the construction and operation of drag hinge damper installations for rotary wing aircraft.

These and other objects and advantages of the invention will be evident or will be pointed out hereinafter in connection with the following detailed description of a preferred embodiment of the invention shown in the accompanying drawings. In these drawings:

Fig. 5 is a diagrammatic illustration of the damper system showing the damper for one of the blades and the control mechanism therefor.

Figure 1:
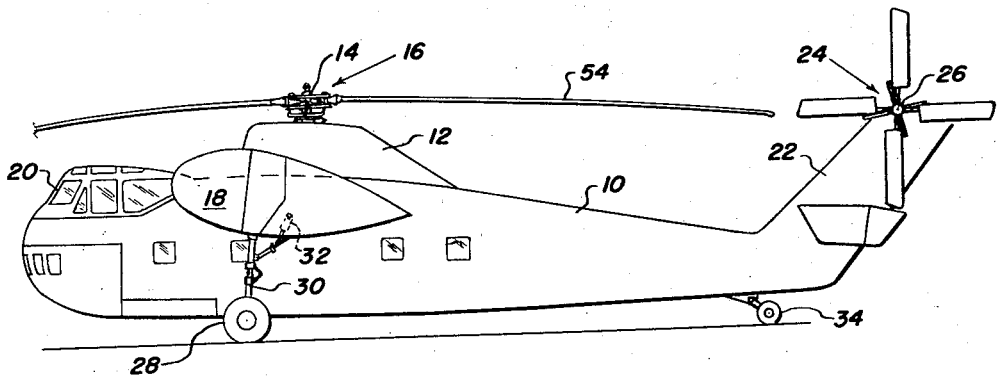
Fig. 1 is a side view of a helicopter of the single sustaining rotor type embodying the invention.

As herein shown, the helicopter embodying the present invention is of the single sustaining rotor type and includes an elongated body 10 which affords a cargo or passenger compartment extending the full length of the ship. A main rotor pylon 12 above the body 10 contains the usual gear box for driving the hub 14 of the main sustaining rotor generally indicated at 16. The engines are mounted in outboard nacelles 18, one of which is provided on each side of the body 10 on stub wings (not shown). A pilot compartment 20 is provided forward of pylon 12 above the passenger compartment.

A tail rotor pylon 22 supports the usual anti-torque tail rotor 24 which is rotatable about a horizontal axis 26. The aircraft is supported on two main landing gears, one of which is associated with each nacelle 18, which are retractible into the nacelles. Each landing gear, one of which is shown in Fig. 1, includes a ground engaging member 28, the usual oleo strut 30 and a hydraulic strut 32 for extending the gear and retracting the gear into the nacelle 18. A usual tail wheel 34 is provided beneath the pylon 22 which completes a tricycle landing gear.

Figure 3:
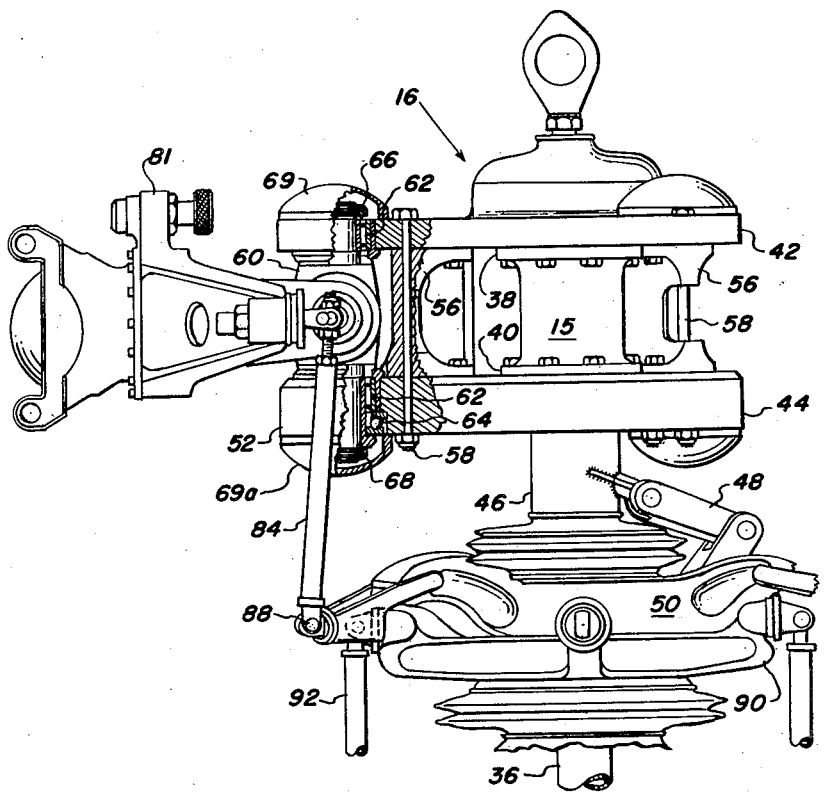
Fig. 3 is a side elevation of Fig. 2 with parts shown in section.

The hub 14 includes a spool 15 which has a splined connection (not shown) to the upper end of a rotor drive shaft 36 and has upper and lower flanges 38 and 40 which are bolted to corresponding spaced plates 42 and 44 as best shown in Fig. 3. Plate 44 has a tubular depending extension 46 to which the scissors 48 which drives the rotating swashplate 50 is pivotally connected.

Figure 2:
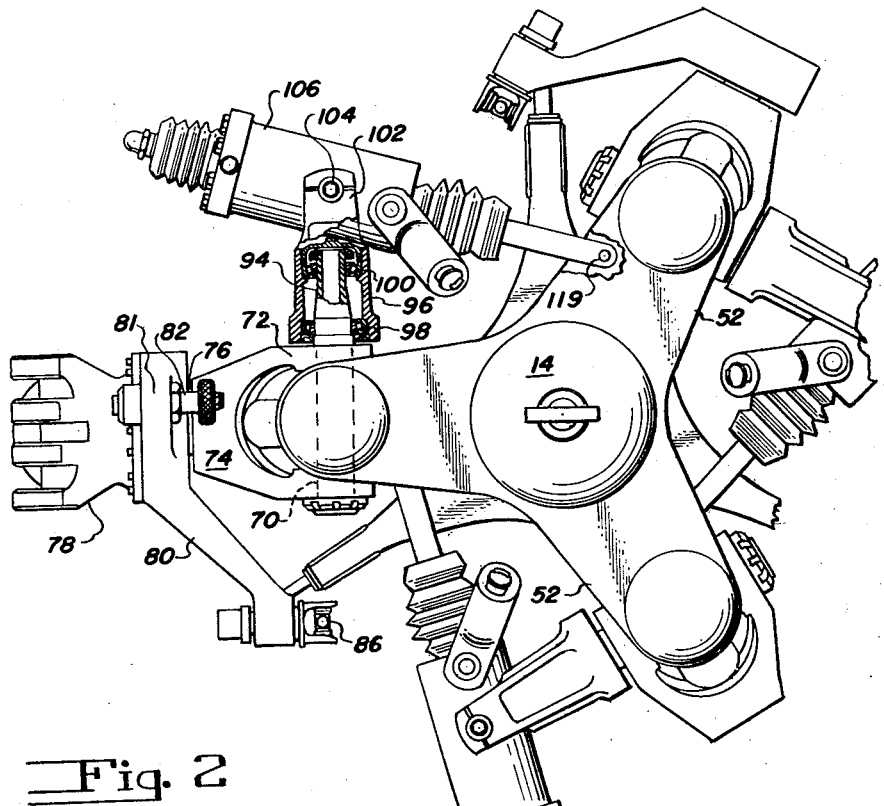
Fig. 2 is an enlarged view of a part of the rotor head of Fig. 1 showing in detail the hub structure for attaching one of the rotor blades and its associated damper.

Plates 42 and 44 have three radially extending arms 52 as shown in Fig. 2, one for each blade 54 of the rotor head. The arms 52 are supported intermediate their length by spacers 56 which are held in position by bolts 58 extended through the spacers and the upper and lower plates 42 and 44. The arms 52 of the upper and lower plates 42 and 44 are in vertical registry and each pair of upper and lower arms supports an articulated rotor blade 54. Since the blades and the mountings therefor are identical, only one has been shown in detail and only one will be described herein. At their extremities the upper and lower arms 52 have vertically aligned apertures in which a drag hinge 60 is journalled on bearings 62. A ball thrust bearing 64 is also provided in the arm of the somewhat heavier lower plate 44, the whole bearing assembly being positioned by upper and lower nuts 66 and 68 which are screw threaded onto the upper and lower ends of the drag hinge. Suitable closure caps 69 and 69a are provided above and below the drag hinge to enclose the bearings and to confine the usual lubricant provided for the bearings. The vertical drag hinge 60 has a transverse passage, the axis of which intersects its own vertical axis. In this passage there is journalled a flapping hinge 70 which is fixed in the forked ends 72 of a flapping link 74.

Figure 4:
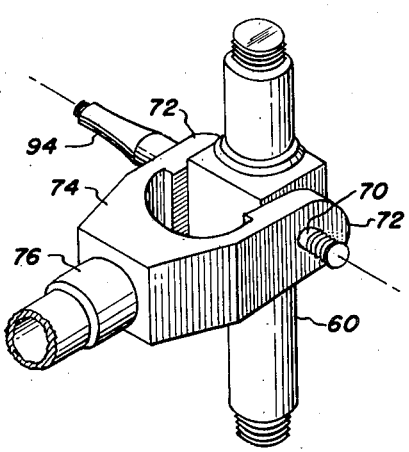
Fig. 4 is a perspective detail showing the drag and flapping hinges for one of the blades.

The blade 54 is attached to the flapping link 74 by means which provide for the folding of the blade. To this end the flapping link has a radially extending feathering spindle 76 (Fig. 4) on which the blade attaching sleeve 78 is journalled for rotation to vary the pitch of the blade. Inboard of the blade attaching sleeve 78 a blade pitch changing horn 80 is also journalled on the spindle 76 and is normally connected with sleeve 78 by a slidable locking pin 82. It will be evident that when the pin 82 is retracted from sleeve 78 the latter can then be rotated freely on the spindle 76 during the blade folding operation. However, when the pin 82 is engaged in the boss 81 of horn 80 and in the corresponding boss of sleeve 78, movement of the blade pitch changing horn 80 will adjust the pitch of the blade about the axis of spindle 76. Control of the blade pitch is obtained in a usual manner through a push-pull rod 84 which connects by universal 86 to the horn 80 and by the universal 88 with the rotatable swashpate member 50. Tilting of the stationary swash plate member 90 is accomplished by means of usual push-pull rods, one of which is shown at 92, to impart cyclic pitch control to the blades of the rotor head.

Referring to Fig. 2, it will be noted that the flapping hinge 70 has a lateral extension 94 on which a damper mounting sleeve 96 is journalled on tapered bearings 98 and 100. The sleeve 96 terminates in a yoke 102 in which vertical trunnions 104 of the damper are journalled. The fluid damper, as shown somewhat diagrammatically in Fig. 5, consists of a cylinder element 106 and a cooperating piston element 108 which forms with the cylinder element 106 two damper chambers 110 and 112 on opposite sides of the piston. The piston is carried by a piston rod 114 which extends through packing glands 116 and 118 in end wall closures 120 and 122 of the cylinder. The piston is attached at its inboard end by a pivotal joint 119 to an adjacent arm 52 of the hub. Resilient stops 124 and 126 are provided at opposite ends of the rod external of the cylinder which engage the outer faces of the gland nuts 128 and 130 to limit the stroke of the piston in the cylinder. Stop 124 is supported by an integral shoulder 132 on the piston rod and is enclosed by a weatherprof boot 134. Stop 126 is supported by a shoulder 135 and a cap nut 136 which is threaded ointo the end of piston rod 114. A weatherproof boot 138 encloses stop 126. It will be noted that the stop 124 is greater in axial dimension than stop 126 and hence has greater resilience since this top limits the more extreme lag movements of the blade.

The damper carries a fluid reservoir 140 mounted on the top of cylinder element 106 at its inboard end which communicates through passage 141 with chamber 112. This reservoir is provided with a filler cap 144 and has formed integral therewith an upwardly and inwardly directed expansion chamber 142 terminating in a vent integral with the cap 144 and freely open to the atmosphere.

The damping action is obtained by means of a restricted passage 146 in piston 108 which normally damps the movements of the cylinder in both directions. The restriction in passage 146 is so chosen as to provide the high damping effect desired to control the blade under conditions favorable to ground resonance. In a typical drag hinge damper this may be 1100 pounds per square inch damper pressure. The piston may also have pressure relief valves 148 and 150 which are spring pressed into closed position and open to relieve the pressure in chambers 110 and 112 respectively if the fluid pressure becomes too high. These valves are safety valves and do not open during normal conditions.

Means are also provided for by-passing fluid around the piston to provide the low damper pressures desirable in normal flight conditions after the aircraft has become airborne. To this end a conduit 152 of relatively large cross section is provided for connecting damper chambers 110 and 112 which can permit practically unrestricted fluid flow in both directions of movement of the damper. Conduit 152 can also be made of a somewhat smaller size so that the restriction will be less than for ground resonance conditions so that a certain limited damping action would be available. A solenoid valve 154 is provided in conduit 152 having a solenoid 156 and an armature 158 which carries a movable valve member 160 normally biased by a spring 162 into position to close the valve passage 164.

Means is also provided to control the energization of solenoid 156 by the extension and retraction of the main landing gear so that when the aircraft has become airborne and the pilot has retracted the gear the solenoid is automatically energized to open valve passage 164 and relieve the bending stresses which would otherwise be applied at the root of the blade spars.

As shown in Fig. 5, oil under pressure is supplied by pump 166 from oil sump 168 and flows through conduit 169, valve 170 and conduit 172 to chamber 174 of the strut 32, thus causing the retraction of the gear. At the same time oil is returned from chamber 176 of strut 32 through conduit 178, valve 170 and conduit 180 to the sump. It will be evident that when the valve 170 is in its alternate position, shown dotted in Fig. 5, the fluid from the pump will flow through conduits 169 and 178 to chamber 176 and the landing gear will be extended from its retracted position in nacelle 18.

When the landing gear reaches its fully retracted position, indicated by dotted lines in Fig. 5, the oleo strut engages the movable switch member 182 of an electric switch carried by the nacelle 30 causing it to engage stationary contacts 184 and establish a circuit from grounded battery 186 through conductor 188, contacts 184, conductor 190, slip ring mechanism 192, conductor 194, solenoid winding 156, conductor 196, slip ring mechanism 198, and conductor 200 to ground. Thus, a circuit is established through the solenoid winding 156, causing the armature 158 and movable valve member 160 to be drawn down against the bias of spring 162 and opening the valve passage 164. The slip ring mechanisms 192 and 198 may consist of a stationary contact element 202 which is built into the non-rotataing swash plate member 90 and a rotatable contact element, or ring, 204 built into the swash plate member 50, the contact elements being carried by confronting forces of the relatively movable swash plate members. A slip ring mechanism of this type is shown and described in the Jensen Patent No. 2,473,147, issued June 14, 1949 and assigned to the assignee of this application.

When a helicopter is on the ground and the rotor is turning preparatory to taking off, the oscillations of the blades about their drag hinges have a low amplitude and a frequency of one in two or three revolutions of the rotor. In order to prevent ground resonance it is desired to have a high damping effect under these conditions and this high damping effect is provided by the restriction 146 in the piston 108. It will be understood that when the aircraft is on the ground the landing gear is extended as shown in Fig. 5 and switch contact 184 is open so that the solenoid winding 156 is de-energized and the movable valve element 160 closes off passage 164.

When the helicopter becomes airborne, however, the amplitude of the lag-lead movements of the blade about their drag hinges is greatly increased and also the frequency of these movements becomes one per revolution of the rotor. Consequently, if the high damping effect afforded by restriction 146 were imposed upon the blades the chordwise bending loads in the blade spars would be high and would result in shortening the life of the blade, unless a heavier blade were used which is, of course, not desirable.

In accordance with this invention, however, when the pilot retracts the landing gear as the latter moves into the landing gear well in nacelle 18, the movable switch element 182 is moved by the landing gear to close contact 184 and energize the solenoid winding 186. As a result, the movable valve element 160 is withdrawn from passage 164 which allows practically free communication between the damper chambers 110 and 112 on opposite sides of the damper piston. It will be noted that the movable valve member 160 is withdrawn by the solenoid only when the latter is energized so that if a failure in the electrical circuit takes place the valve will automatically close under the action of spring 162. Thus, a pilot will never be forced to make a landing without adequate damping to prevent ground resonance.

It will be evident that as a result of this invention automatic means has been provided for obtaining optimum damping effect when the ship is on or near the ground and ground resonance is possible and also for obtaining optimum damping effect after the ship has become airborne when entirely different damping effects are required. Also, it will be evident that this automatic control of the blade dampers has been made possible with an extremely simple mechanism which is controlled by existing structure on the ship. Further, it will be evident that the pilot can always obtain hard damper effects by merely lowering his landing gear as he will naturally do as he comes in for a landing. Since the control of the dampers is automatically accomplished by the extending and retracting of the landing gear, the pilot does not have to worry about blade damping.

While only a single embodiment of the invention has been shown herein for purposes of illustration, it will be evident that various changes in the construction and arrangement of the parts may be resorted to without departing from the scope of the invention.

I claim:

1. A rotary wing aircraft having a fuselage, retractable landing gear carried by said aircraft, a sustaining rotor mounted for rotation above said aircraft having a blade pivoted for lag-lead movements in the plane of blade rotation, a damper controlling the lag-lead movements of said blade, pilot operable means for retracting and extending said landing gear and means responsive to the operation of said landing gear for varying the damping effort of said damper.

2. In a helicopter having a body, a landing gear, a sustaining rotor comprising a shaft, a rotor hub mounted on said shaft, a rotor blade connected to said hub by a hinge permitting blade movement in the plane of rotation relative to said hub, damping means interconnecting said blade and said hub for controlling said movement about said hinge, and means operated by said landing gear for controlling said damping means.

3. In a rotary wing aircraft having retractable landing gear, a rotor hub, a blade pivoted on said hub for lag-lead movements, a hydraulic damper for controlling said movements including cooperating piston and cylinder elements, one movable with said blade and the other carried by relatively stationary hub structure, said damping elements providing two variable volume chambers on opposite sides of said piston element, means providing a restricted passage between said chambers, means providing a relatively free passage between said chambers, a valve normally biased into a position to close said free passage, and means responsive to movement of said landing gear into retracted position for automatically opening said valve.

4. In a rotary wing aircraft having retractable landing gear, a rotor hub, a blade pivoted on said hub for lag-lead movements, a hydraulic damper for controlling said movements including cooperating piston and cylinder elements, one movable with said blade and the other carried by relatively stationary hub structure, said damping elements providing two variable volume chambers on opposite sides of said piston element, means providing a restricted passage between said chambers, means providing a relatively free passage between said chambers, a valve normally biased into a position to close said free passage, and means actuated by landing gear as it moves into retracted position for automatically moving said valve into open position and for holding said valve open against its bias while said landing gear remains in its retracted position.

5. In a rotary wing aircraft, a body, retractable landing gear mounted on said body, hydraulic means for moving said gear between extended and retracted position relative to said body, pilot operative means for controlling said hydraulic means, a rotor drive shaft extending upwardly from said body, a hub driven by said shaft, a rotor blade pivotally mounted on said hub for lag-lead movements in the plane of blade rotation, a hydraulic damper including cooperating piston and cylinder elements one carried by said blade and the other carried by said hub and forming damper chambers in said cylinder on opposite sides of said piston element, means for supplying fluid to said damper chambers, means for controlling the damper force as relative movement takes place between said damper elements including a restricted passageway connecting said chambers providing a high damper force, a relief passageway connecting said chambers providing a low damper force, a valve controlling said relief passageway, and means responsive to extension and retraction of said landing gear for controlling said valve to close and open said relief passageway.

6. In a rotary wing aircraft, a body, retractable landing gear mounted on said body, hydraulic means for moving said gear between extended and retracted position relative to said body, pilot operative means for controlling said hydraulic means, a rotor drive shaft extending upwardly from said body, a hub driven by said shaft, a rotor blade pivotally mounted on said hub for lag-lead movements in the plane of blade rotation, a hydraulic damper including cooperating piston and cylinder elements one carried by said blade and the other carried by said hub forming damper chambers in said cylinder on opposite sides of said piston element, means for supplying fluid to said damper chambers, means for controlling the damper force as relative movement takes place between said damper elements including a restricted passageway connecting said chambers providing a high damper force, a relief passageway connecting said chambers providing a low damping force, a solenoid valve controlling said relief passageway and biased into position to close the latter when de-energized, and means including a switch controlled by the movement of said landing gear into retracted position for energizing said solenoid.

7. In a rotary wing aircraft, a body, retractable landing gear mounted on said body, hydraulic means for moving said gear between extended and retracted position relative to said body, pilot operative means for controlling said hydraulic means, a rotor drive shaft extending upwardly from said body, a hub driven by said shaft, a rotor blade pivotally mounted on said hub for lag-lead movements in the plane of blade rotation, a hydraulic damper including cooperating piston and cylinder elements one carried by said blade and the other carried by said hub forming damper chambers in said cylinder on opposite sides of said piston element, means for supplying fluid to said damper chambers, means for controlling the damper force as relative movement takes place between said damper elements including a restricted passageway connecting said chambers providing a high damper force, a relief passageway connecting said chambers providing a low damping force, and mechanism for insuring that said relief passageway will always be closed during landing and take-off if the aircraft including a fail-safe valve biased to close said relief passageway, power operated means for opening said valve against its bias, and means responsive to the movement of said landing gear into retracted position for energizing said power operated means.

8. A fluid damper for controlling the lag-lead movements of a rotor blade of a rotary wing aircraft comprising, cooperating piston and cylinder elements forming variable volume chambers on opposite sides of said piston element, means for supporting one of said elements for movement with said blade, means for supporting the other of said elements on structure relative to which said blade moves, first passage means connecting said chamber providing restricted fluid flow therebetween, second passage means connecting said chambers providing relatively free fluid flow therebetween, a valve in said second passage means normally biased into position to close said second passage, and pilot operative means for opening said valve.

9. A fluid damper for controlling the lag-lead movements of a rotor blade of a rotary wing aircraft comprising, cooperating piston and cylinder elements forming variable volume chambers on opposite sides of said piston element, means for supporting one of said elements for movement with said blade, means for supporting the other of said elements on structure relative to which said blade moves, first passage means connecting said chambers having a restriction therein for providing restricted fluid flow therebetween, second passage means connecting said chambers for providing relatively free flow therebetween, a solenoid valve normally biased when de-energized into a position to close said second passage means, and pilot operative means for energizing said solenoid valve to open said second passage means.

10. A rotary wing aircraft having a fuselage, said fuselage having a pilot compartment, a rotor hub, a blade pivoted on said hub for lag-lead movements, a damper controlling the lag-lead movements of said blade, pilot operable means in said compartment, and means interconnecting said pilot operable means with said damper for varying the damping effect of said damper during flight.

11. A rotary wing aircraft having a fuselage, said fuselage having a pilot compartment, a rotor hub, a blade pivoted on said hub for lag-lead movements, a damper including a cylinder and piston unit controlling the lag-lead movements of said blade, each end of said cylinder being connected by a passageway, a valve in said passageway, pilot operable means in said compartment, means interconnecting said pilot operable means with said valve for varying the damping effect of said damper during flight.

References Cited in the file of this patent
UNITED STATES PATENTS

| | | |
|---|---|---|
| 1,219,035 | Pettengill | Mar. 13, 1917 |
| 2,494,985 | Campbell | Jan. 17, 1950 |
| 2,629,567 | Papadakos | Feb. 24, 1953 |
| 2,638,994 | Buivid | May 19, 1953 |